(No Model.)

H. McCARTHY.
HARVESTER REEL.

No. 302,756. Patented July 29, 1884.

Witnesses.
J. B. Fetherstonhaugh
Charles C. Baldwin

Inventor.
Hiram McCarthy
by Donald C. Ridout & Co
Att'ys (No Model.) H. McCARTHY. 2 Sheets—Sheet 2.
HARVESTER REEL.

No. 302,756. Patented July 29, 1884.

Witnesses. Inventor.
J. B. Fetherstonhaugh Hiram McCarthy
Charles C. Baldwin by Donald C. Ridout & Co
att'y

UNITED STATES PATENT OFFICE.

HIRAM McCARTHY, OF MOUNT FOREST, ONTARIO, CANADA.

HARVESTER-REEL.

SPECIFICATION forming part of Letters Patent No. 302,756, dated July 29, 1884.

Application filed January 2, 1884. (No model.) Patented in Canada January 22, 1884, No. 18,455.

*To all whom it may concern:*

Be it known that I, HIRAM McCARTHY, of the town of Mount Forest, in the county of Wellington, in the Province of Ontario, Canada, machinist, have invented certain new and useful Improvements in Harvester-Reels; and I do hereby declare that the following is a full, clear, and exact description of the same.

The object of the invention is to devise a reel so arranged that it may be readily adjusted for the purpose of handling long and short grain, as well as grain lying at different angles; and it consists, essentially, in a revolving reel having its beaters so connected that the diameter of the circle described by them may be increased or decreased at will, and the angle at which they are attached or connected to the finger-beam may be readily adjusted.

Figure 1:
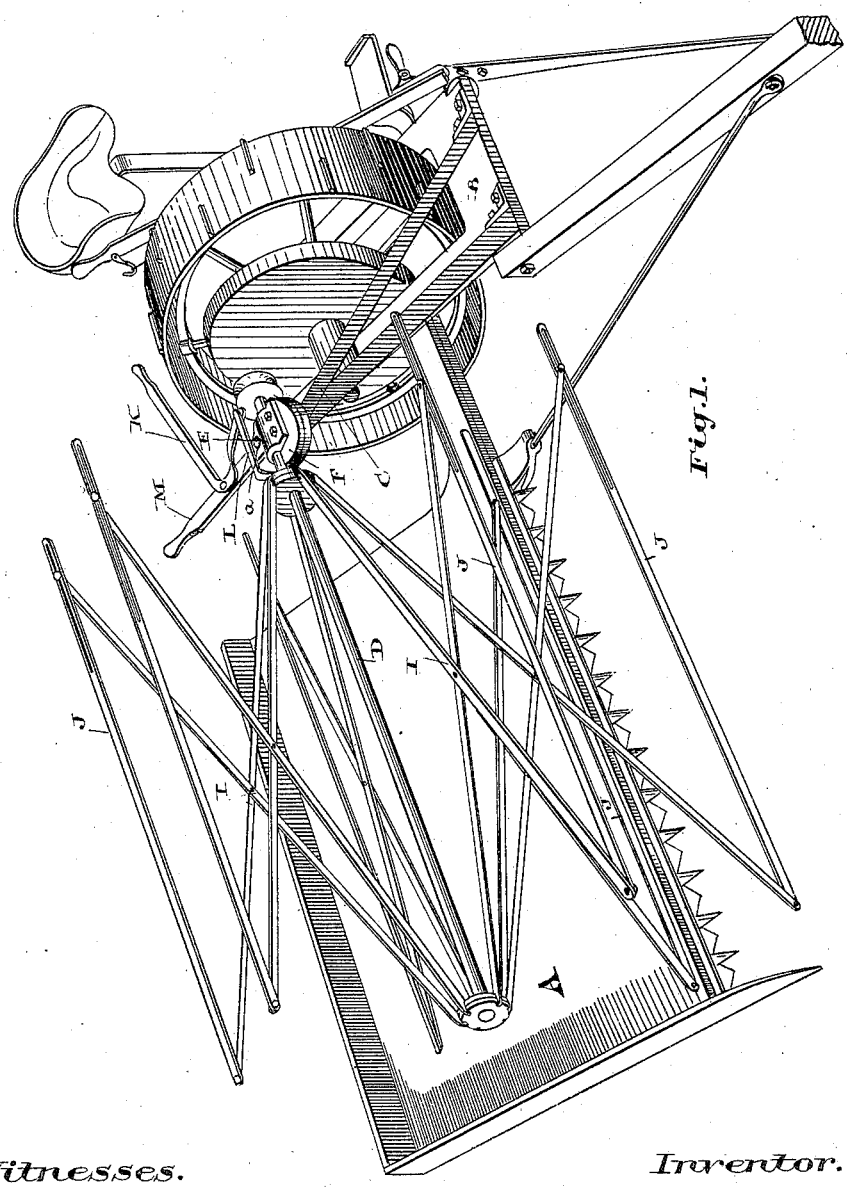
Figure 2:
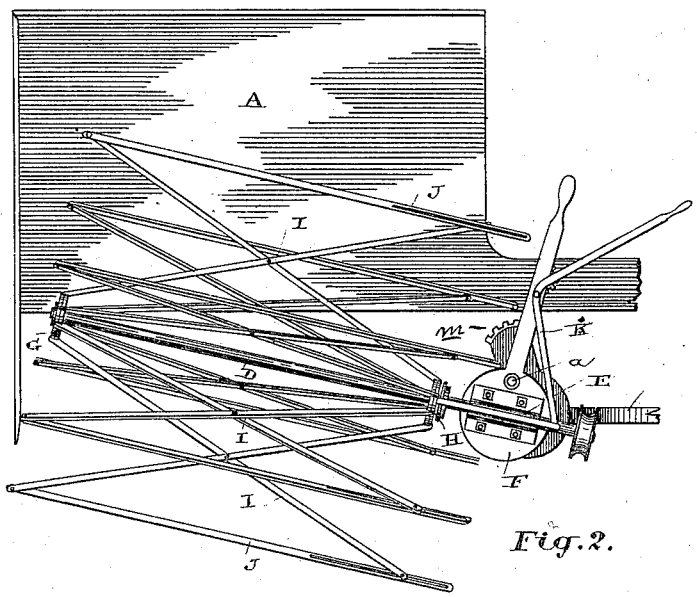
Figure 3:
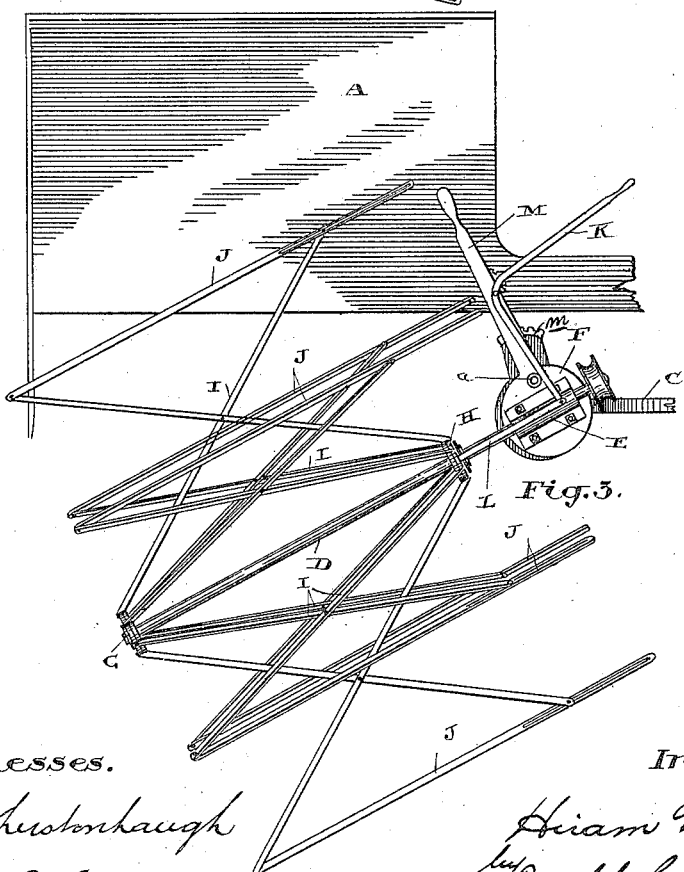

Figure 1 is a perspective view of my improved reel with sufficient of the harvester to show the peculiar connection of the reel to it. Fig. 2 is an enlarged plan of my improved reel, showing it contracted and set at angle to catch grain lying from the machine. Fig. 3 is a similar view showing my improved reel expanded and set at angle to catch grain lying at an angle toward the machine.

In the drawings, A is the grain-table. B is the main frame of the machine, from which the standard C extends. D is a reel-shaft the inner end of which is carried in a suitable bearing or bearings, E, which bearing is fixed to the plate F, which is eccentrically pivoted at *a* on the top of the standard C. The reel-shaft D is connected in the ordinary way to some moving part of the machine, so that it shall derive the revolving motion required. As there is nothing peculiar required in the mechanism for connecting the reel-shaft to the moving part of the machine, it is not necessary to describe it, nor do I show it in the drawings.

G is a collar fixed on the end of the shaft D, while H is a correspondingly-shaped collar adjustably fitted on the said shaft D, and held from revolving thereon by a feather, key, or analogous device.

I are lazy-tongs, the ends of which are connected, respectively, as shown, to the beaters J and collars G and H. It follows, therefore, that by the longitudinal adjustment of the collar H on the reel-shaft D the beaters J are thrown from or drawn toward the shaft D, so that the diameter described by them may be thus readily increased or decreased, as circumstances require, to render them efficient for acting on different classes of grain. For instance, when the grain is short, it is necessary to bring the beaters closer to the ground than when the grain is long.

While various devices might readily be devised for moving the collar H, in order to actuate the lazy-tongs for the purpose of adjusting the beaters, I show in the drawings merely a pivoted hand-lever, K, connected to the collar by the rod L. As before stated, I pivot the plate F, which carries the reel-shaft, at *a*, and provide any suitable lever, M, for turning the said plate on its pivot. It will be seen that the lever K, which is a bell-crank lever, is pivoted at its bend to the lever M. This is important, for by this construction the lever M may be operated to change the diameter of the reel without altering the angle of the reel-shaft, and the lever K may be operated to change the angle of the shaft D without altering the diameter of the reel. Beneath the lever M, I provide the locking-plate *m*, to which said lever may be fastened by any ordinary dog or fastening device connected therewith. It is important that the pivot *a* should be off the center of the shaft D; otherwise the beaters J will be drawn from the grain side of the machine when the angle of the shaft D is altered in the direction shown in Fig. 2, whereas by placing the pivot-point *a* eccentric to the said shaft the outer ends of the beaters J will be thrown toward the grain side of the machine when the shaft is angled, as shown in Fig. 2, and in this way no grain which should fall on the grain-table A will miss the action of the beaters. The same desirable effect is attained when the shaft D is thrown at the angle shown in Fig. 3. In this case the inner ends of the beaters J are thrown toward the inside end of the finger-beam.

Any one familiar with the action of a reaping-machine on short spindley grain will appreciate the advantage of a reel having its beaters arranged to travel at a greater speed when brought to act against grain of this description. This, as will be understood from the foregoing specification, is effected by the expansion of the beaters in the manner hereinbefore described. The speed of the shaft D being constant, the speed of the beaters will of course be in proportion to the diameter of the circle described by them; therefore quick for short spindley grain, and slow when long grain is being handled.

What I claim as my invention is—

1. In combination with a harvester, a revolving reel, its shaft, and a plate pivoted on a standard in front of the finger-beam, and provided with bearings for the reel-shaft, the pivot of said plate being to one side of the line of rotation of said reel-shaft and at right angles to the plane of the same, substantially as and for the purpose specified.

2. In combination with a harvester, a revolving reel, its shaft, a plate pivoted on the standard in front of the finger-beam, and provided with bearings for the reel-shaft, the lever M, and locking device $m$, for changing the angle of said shaft and locking it in the desired position, substantially as and for the purpose specified.

3. The combination, with the shaft D, fixed collar G, adjustable collar H, beaters J, diagonal bars I, and plate F, of the lever M, connected to said plate, and the lever K, pivoted to said lever M, and connected to the collar H by the rod L, whereby the diameter of the reel may be varied without altering the angle of the shaft D, and the angle of the shaft D varied without altering the diameter of the reel, substantially as described.

Toronto, December 11, 1883.

HIRAM McCARTHY.

In presence of—
CHARLES C. BALDWIN,
F. BARNARD FETHERSTONHAUGH.